(12) United States Patent
Mannheim Astete et al.

(10) Patent No.: US 11,504,948 B2
(45) Date of Patent: Nov. 22, 2022

(54) LAMINATED GLAZING WITH A STEP-SHAPED FUNCTIONAL PORTION

(71) Applicant: AGP America S.A., Ciudad de Panama (PA)

(72) Inventors: Mario Arturo Mannheim Astete, Lima (PE); Andres Fernando Sarmiento Santos, Lima (PE); Vincenzo Mannino, Lima (PE); Juan Pablo Suárez, Lima (PE); Laura Granados Caro, Lima (PE); Joel Benavides, Lima (PE)

(73) Assignee: AGP America S.A., Panama (PA)

( * ) Notice: Subject to any disclaimer, the term of this patent is extended or adjusted under 35 U.S.C. 154(b) by 122 days.

(21) Appl. No.: 17/043,327

(22) PCT Filed: Mar. 29, 2019

(86) PCT No.: PCT/IB2019/052612
§ 371 (c)(1),
(2) Date: Sep. 29, 2020

(87) PCT Pub. No.: WO2019/186495
PCT Pub. Date: Oct. 3, 2019

(65) Prior Publication Data
US 2021/0023821 A1  Jan. 28, 2021

Related U.S. Application Data

(60) Provisional application No. 62/651,121, filed on Mar. 31, 2018.

(30) Foreign Application Priority Data

Jun. 13, 2018 (CO) .................. NC2018/0006028

(51) Int. Cl.
*B32B 17/10* (2006.01)
(52) U.S. Cl.
CPC .. *B32B 17/10541* (2013.01); *B32B 17/10477* (2013.01); *B32B 17/10513* (2013.01);
(Continued)
(58) Field of Classification Search
CPC ........ B32B 17/10541; B32B 17/10788; B32B 17/10513; B32B 17/10477;
(Continued)

(56) References Cited

U.S. PATENT DOCUMENTS

| 5,227,241 A | * | 7/1993 | Chaussade | .............. B32B 27/22 428/501 |
| 6,708,595 B1 | * | 3/2004 | Chaussade | .......... B32B 17/1033 89/36.02 |

(Continued)

FOREIGN PATENT DOCUMENTS

WO  2014029605 A1  2/2014

*Primary Examiner* — Michael M. Bernshteyn
(74) *Attorney, Agent, or Firm* — The Morales Law Firm; Joseph L. Morales

(57) ABSTRACT

A laminated glazing with at least one step-shaped functional portion comprising two stack of components, the main stack of components in which the alteration of its properties is not desirable, and a second stack of components comprising a functional layer.

17 Claims, 4 Drawing Sheets

(52) U.S. Cl.
CPC .... *B32B 17/10788* (2013.01); *B32B 17/1077* (2013.01); *B32B 17/10908* (2013.01); *B32B 2333/12* (2013.01); *B32B 2369/00* (2013.01); *B32B 2375/00* (2013.01)

(58) Field of Classification Search
CPC .......... B32B 17/1077; B32B 17/10908; B32B 2369/00; B32B 2375/00; B32B 2333/12
USPC ........................................................ 428/437
See application file for complete search history.

(56) References Cited

U.S. PATENT DOCUMENTS

2008/0187721 A1* 8/2008 Engl ................. B32B 17/10045
423/385
2017/0192257 A1 7/2017 Branda et al.

\* cited by examiner

LAMINATED GLAZING WITH A STEP-SHAPED FUNCTIONAL PORTION

FIELD OF THE INVENTION

The present disclosed invention is directed to a laminated glazing having a non-uniform surface, and, more particularly, to a laminated glazing comprising a step-shaped functional portion.

BACKGROUND OF THE INVENTION

In response to the regulatory requirements for increased automotive fuel efficiency as well as the growing public awareness and demand for environmentally friendly products, automotive original equipment manufacturers, around the world, have been working to improve the efficiency of their vehicles.

One of the key elements of this strategy to improve efficiency has been the concept of light weighting. Often, more traditional, less expensive, conventional materials and processes are being replaced by innovative new materials and processes which while sometime being more expensive, still have higher utility than the materials and processes being replaced due to their lower weight and the corresponding increase in fuel efficiency. Sometimes, the new materials and processes bring with them added functionality as well in addition to their lighter weight. Vehicle glazing has been no exception.

By reducing the weight of the vehicle substantial improvements can be made in energy consumption. This is especially important for electric vehicles where the improvement directly translates into an increase in the range of the vehicle which is a key consumer concern.

The glazed area of vehicles has been steadily increasing and, in the process, displacing other heavier materials. The popular large glass panoramic roofs and windshields are just one example of this trend. A panoramic roof is a vehicle roof glazing which comprises a substantial area of the roof over at least a portion of both the front and rear seating areas of the vehicle. A panoramic roof may be laminated or monolithic. Likewise, a panoramic windshield is a windshield on which the top edge has been substantially extended such that it comprises a portion of the vehicle roof.

The glass used in the doors, rear window and side windows of most vehicle is made from tempered glass. While tempered glass can withstand high loads, it can be easily broken by striking with a hard object or through the use of a spring loaded center punch. When tempered glass fails, the entire window opening is left unprotected.

Another problem that tempered glass presents is when it fails during an accident. In this case, and especially in a rollover accident, the glass disintegrates leaving the window opening with nothing to prevent ejection of the occupant. Ejection of the occupant and the extension of portions of the body through window openings is a major cause of traffic fatalities and injuries.

On the other hand, windshields are made of laminated annealed glass. Annealed glass is glass that has been slowly cooled from the bending temperature down through the glass transition range. This is done to relieve any stress in the glass. Annealed glass breaks into large shards with sharp edges. In a laminate, two sheets of annealed glass are bonded together using a thermo plastic (interlayer). For automotive applications, the most commonly used bonding layer or interlayer is polyvinyl butyl (PVB). In addition to polyvinyl butyl, ionoplast polymers, ethylene vinyl acetate (EVA), cast in place (CIP) liquid resin and thermoplastic polyurethane (TPU) can also be used.

If the laminated glass should break, the bonding layer holds the shards of glass together, helping to maintain the structural integrity of the glass. The shards of broken glass tend to interlock much like the pieces of a jigsaw puzzle. A vehicle with a broken windshield can still be operated, often for an extended period if the damage is not in the vision zones or too extensive. On impact, the bonding layer also helps to prevent penetration by the occupant in the event of a collision or by objects striking the laminate from the exterior of the vehicle.

Due to the lower cost and higher strength of tempered glass, tempered glass has been favored for all but the windshield position where tempered glass is not permitted. However, on some higher end vehicles, laminated glass has been used for the doors rather than tempered glass. This is at least in part because a laminated glass can make use of functional films. The uses for these films include but are not limited to: solar control, variable light transmission, increased stiffness, increased structural integrity, improved penetration resistance, improved occupant retention, providing a barrier, tint, providing a sunshade, color correction, and as a substrate for functional and aesthetic graphics.

However, one of the problems faced when laminating a glazing comes from the different optimal lamination parameters required for some of the components in the stack, i.e. lamination have to be performed under a range of pressures and temperatures to obtain good adhesion to the glass substrates while not compromising other functional characteristics on the glazing. For example, optics in the visible area of a windshield could be affected due to the lamination of a component at a lower lamination temperature than required. Another problem is that, when functional layers are smaller than other layers in the laminate, compensation is needed to offset the change in thickness, resulting in optical distortion.

It would be advantageous to be able to produce a laminated glazing with a functional portion in a more efficient manner.

SUMMARY OF THE INVENTION

In this sense, it is an object of the present invention to provide a laminated glazing having at least one functional layer disposed on a section of said glazing without altering other sections thereof.

This object can be attained by a laminated glazing with at least one step-shaped functional portion comprising first stack of components and at least one second stack of components. The first stack of components comprises an exterior glass layer having inner and outer surfaces, an interior glass layer having inner and outer surfaces, and at least one plastic bonding layer located between inner surfaces of said exterior and interior glass layers. Each stack of said at least one second stack of components comprises a glazing layer, at least one functional layer, and at least one plastic bonding layer. In addition, each stack of said at least one second stack of components is disposed on and bonded to a section of the outer surface of the interior glass layer of the first stack of components by one plastic bonding layer of said at least one plastic bonding layer, forming a step-shaped portion.

As can be noted, in the present invention, functional layers are not disposed in the main stack of components (first stack), but in the second stack of components, avoiding thickness compensation and/or single-step lamination processes. In addition, the present invention allows reducing components, weight, cost and aesthetic issues, such as when implemented as a windshield with two step-shaped dynamic sun visors.

BRIEF DESCRIPTION OF THE DRAWINGS

These features and advantages of the present invention will become apparent from the detailed description of the following embodiments in conjunction with the accompanying drawings, wherein.

DETAILED DESCRIPTION OF THE INVENTION

Figure 1:
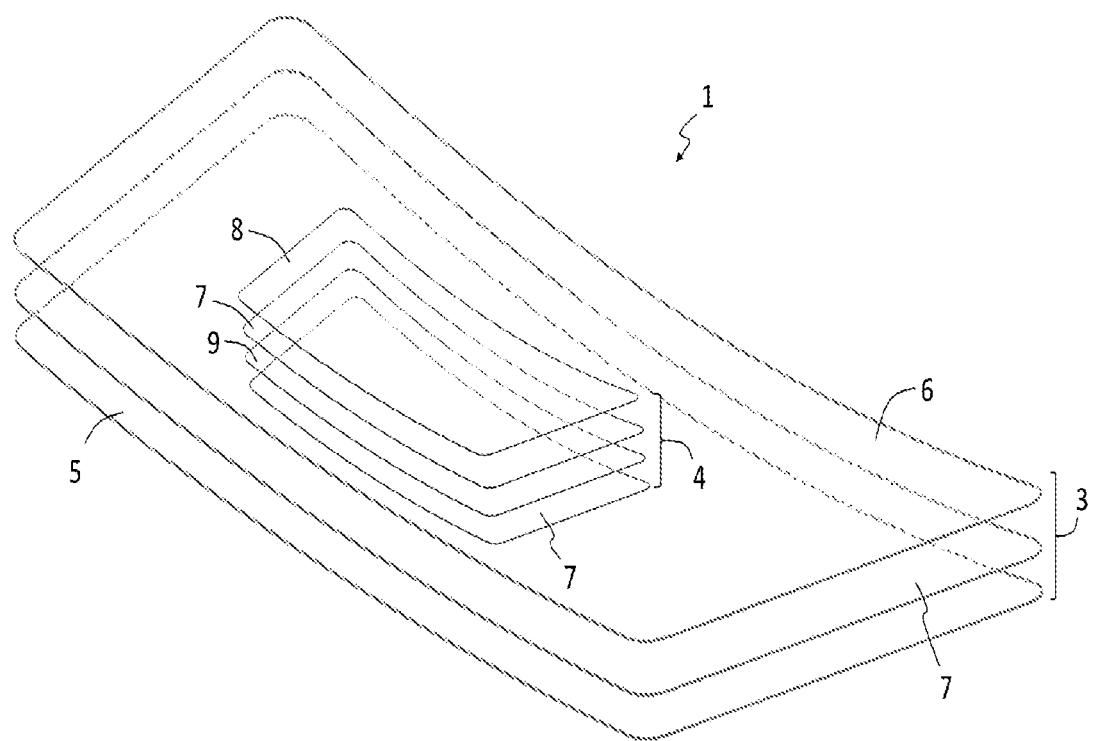
FIG. 1 shows an exploded view of a laminated glazing with a step-shaped functional portion according to an embodiment of the present invention.

Referring now to the drawings, there are shown preferred embodiments of the laminated glazing with at least one step-shaped functional portion according to the present invention.

FIG. 1 shows an exploded view of a laminated glazing 1 with one step-shaped functional portion having a first stack of components 3 and a second stack of components 4. The first stack of components 3 comprises an exterior 5 and interior 6 glass layers bonded to each other by a plastic bonding layer 7. Additionally, the second stack of components 4 comprises a glass layer 8, a functional layer 9 and two plastic bonding layers 7. The functional layer 9 is secured to the glass layer 8 by one of the plastic bonding layers 7, while the remaining plastic bonding layer 7 allows the second stack of components 4 to be bonded to the first stack of components 3. In this embodiment, the laminated glazing 1 is a rear window and the functional layer 9 is a display.

Figure 2A:
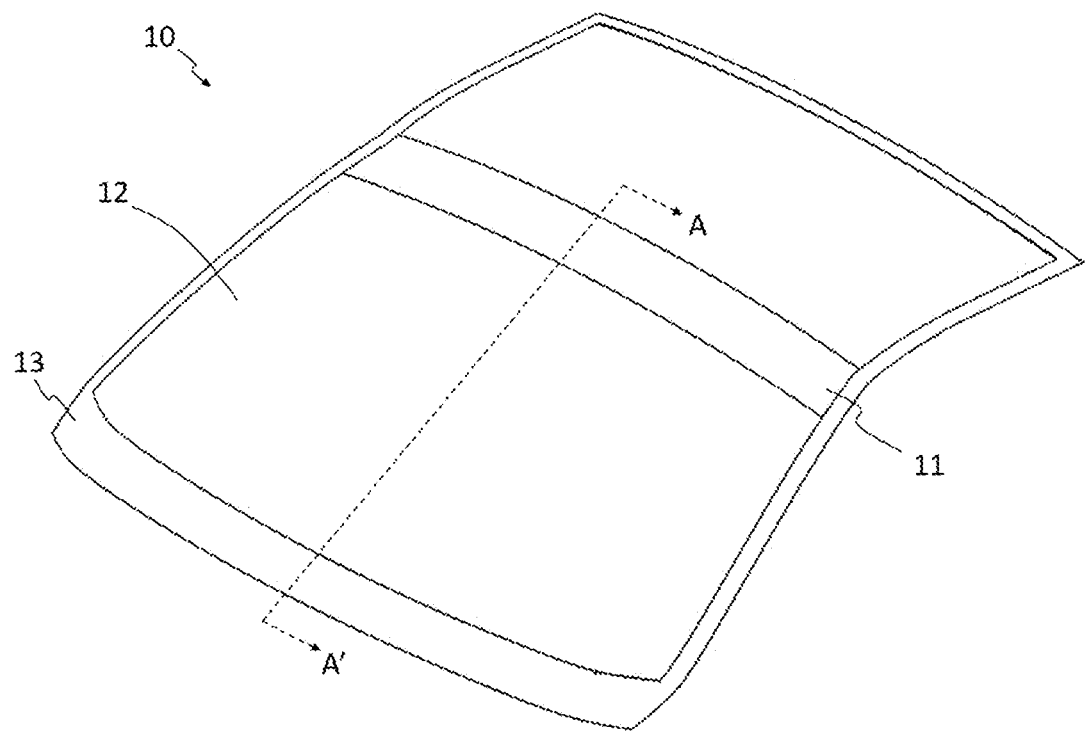
FIG. 2A shows an isometric view of a panoramic windshield with a step-shaped variable light sun visor according to an embodiment of the present invention.
Figure 2B:
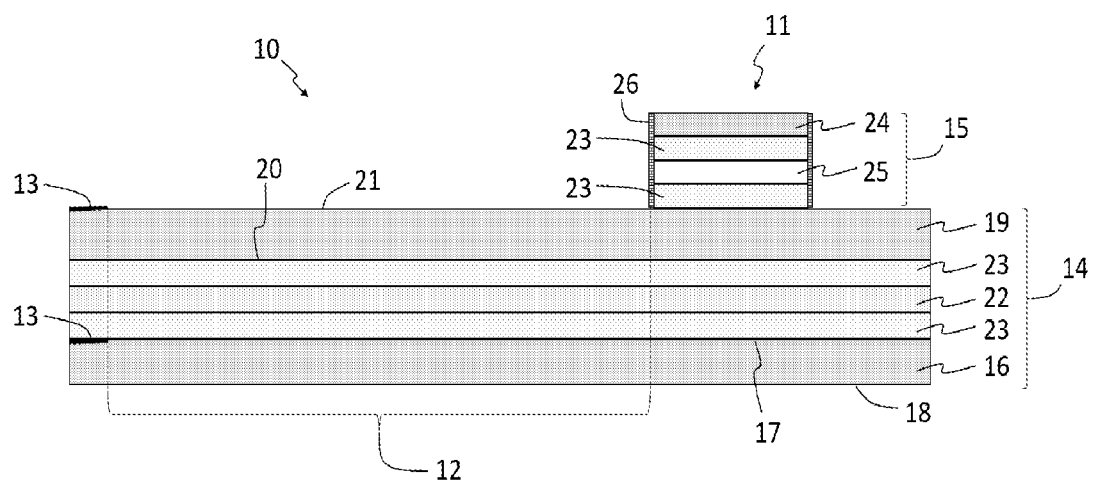
FIG. 2B shows a cross sectional view A-A' of the panoramic windshield of FIG. 2A.

FIGS. 2A and 2B show an exemplary embodiment wherein a panoramic windshield 10 having a step-shaped variable light sun visor 11 comprises a first stack of components 14 and a second stack of components 15. The first stack of components 14 comprises an exterior glass layer 16 having inner 17 and outer 18 surfaces, an interior glass layer 19 having inner 20 and outer 21 surfaces, two PVB plastic bonding layers 23 located between inner surfaces 17, 20 of said exterior 16 and interior 19 glass layers, and a functional layer 22. In this embodiment, the functional layer 22 is a solar control film such as XIR®. A black obscuration 13 is printed on both exterior 16 and interior 19 glass layers.

The second stack of components 15 comprises a functional layer 25 bonded to a glass layer 24 by a PVB plastic bonding layer 23, said functional layer 25 being sandwiched between two PVB plastic bonding layers 23. In this embodiment, the functional layer is a switchable layer 25. The second stack of components 15 is disposed on and bonded to a section of the outer surface 21 of the interior glass layer 19 of the first stack of components 14 by one of its PVB plastic bonding layers 23. In this embodiment, said section is above the driver vision zone 12. Furthermore, in this embodiment, the glass layer 24 is an aluminosilicate glass having a thickness from 0.5 mm to 1.1 mm. In some embodiments, said aluminosilicate glass is an aluminosilicate cold bent glass.

In addition, a peripheral sealant layer 26 surrounds the edge faces of the second stack of components 15 to improve durability. In several embodiments, the peripheral sealant layer 26 is a polyurethane layer.

Figure 3:
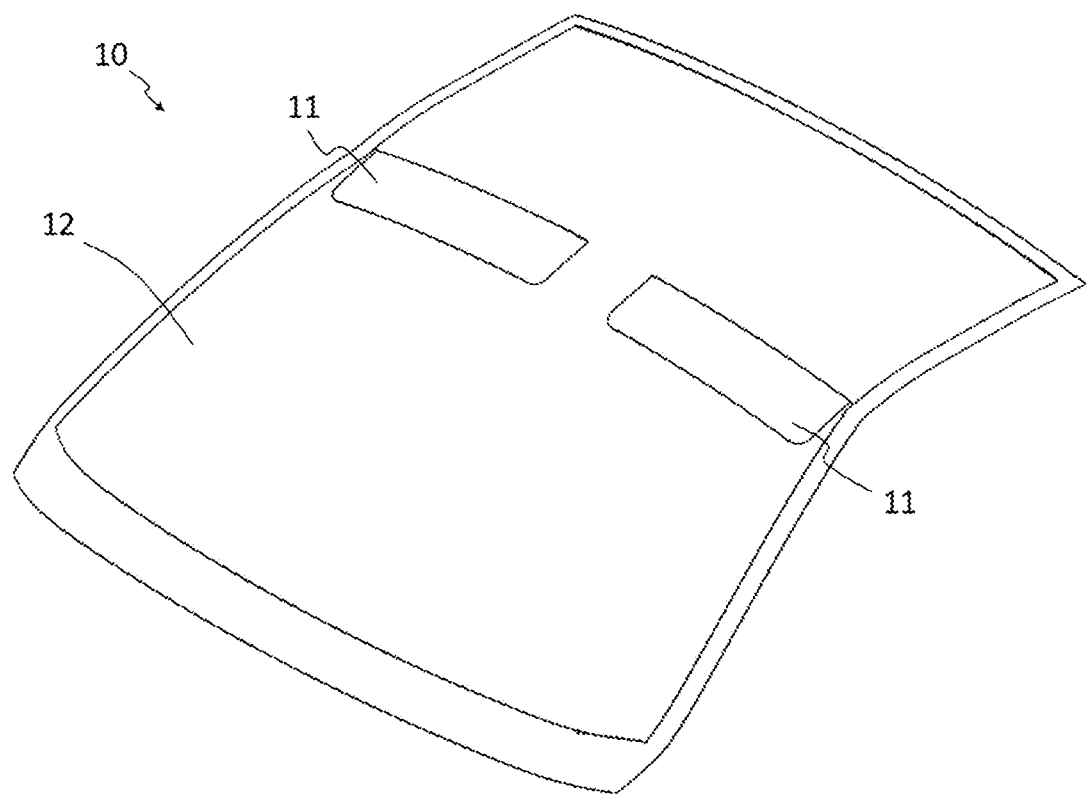
FIG. 3 shows an isometric view of a panoramic windshield with two step-shaped sun visors according to an embodiment of the present invention.

FIG. 3 shows an alternate version of the windshield shown in FIGS. 2A and 2B, in which a switchable layer is used to provide dual rectangular sun visors 11. In this embodiment, the switchable layer is a SPD (Suspended Particle Devices) film. However, it must be recognized that other switchable films can be used, such as PDLC (Polymer Dispensed Liquid Crystal), LC (Liquid Crystal), electrochromic and thermochromic.

Figure 4A:
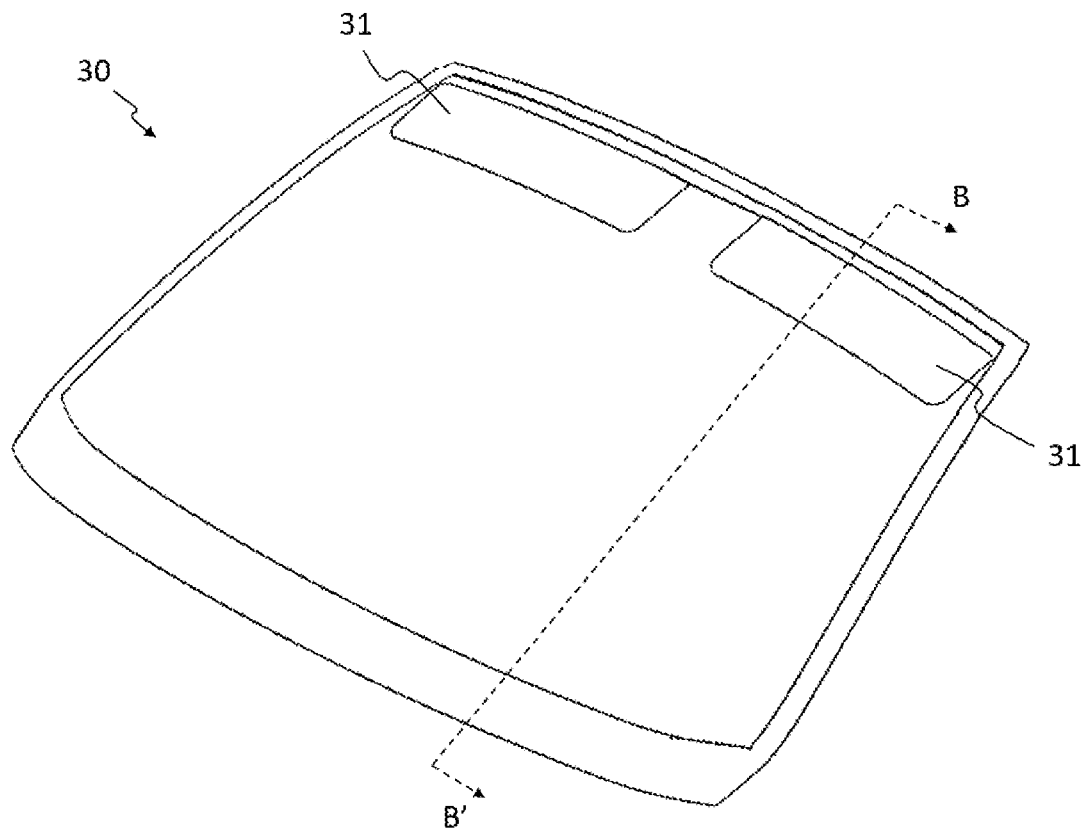
FIG. 4A shows an isometric view of a windshield with two step-shaped variable light sun visors according to an embodiment of the present invention.
Figure 4B:
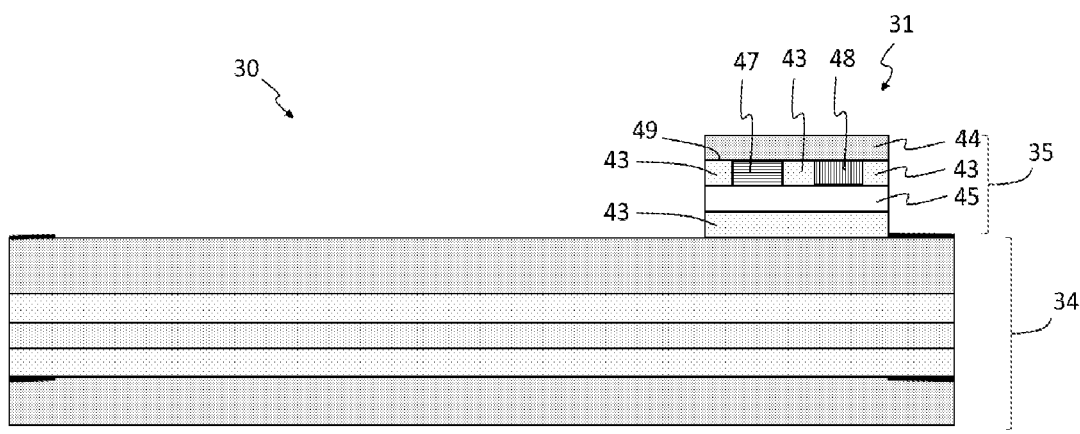
FIG. 4B shows a cross sectional view B-B' of the windshield of FIG. 4A.

FIGS. 4A and 4B show an exemplary embodiment wherein a windshield 30 having two step-shaped variable light sun visor 31 comprises a first stack of components 34 and a second stack of components 35. The first stack of components 34 has the same configuration as that of the embodiment of FIG. 2B described above; while the second stack of components 35 comprises a glazing layer 44, plastic bonding layers 43 and three functional layers: a switchable layer 45 for variable light transmission, a touch sensitive layer 47 and an acoustic sensor layer 48. Both touch sensitive layer 47 and acoustic sensor layer 48 are coupled to the switchable layer 45 for controlling light transmission of the switchable layer 45. The touch sensitive layer 47 is a capacitive array projecting an electrical field through the glazing layer 44. However, in other embodiments, the touch sensitive layer 47 can detect the movement of a finger by using heat detection, reflected light or any other well-known technology. Acoustic sensors are available from a variety of types and are provided with appropriate transducers and circuitry, allowing the detection of voice commands of a user. Furthermore, in this embodiment, the touch sensitive layer 47 and the acoustic sensor layer 48 are surrounded by one of the plastic bonding layers 43 in the same plane. However, in some embodiments, the touch sensitive layer 47 and the acoustic sensor layer 48 are placed in a different plane with one or more plastic bonding layers in between. Additionally, the second stack of components 35 comprises a thin black band (not shown) applied to the inner surface 49 of the glazing layer 44 for aesthetics. The thin black band can be either an organic or an inorganic paint.

It will be understood that the relative dimensions and shapes of the components shown in FIGS. 1, 2A, 2B and 3 are merely for illustrative purposes of exemplary embodiments, and these relative dimensions and shapes are not to be construed as a limitation.

In an alternate version of the laminated glazing depicted in FIG. 1, the laminated glazing is a side window and the functional layer in the second stack of components is a layer that absorbs sound and reduces the level transmitted through the laminated glazing, such an acoustic PVB.

In an alternate version of the embodiment depicted in FIGS. 4A and 4B, the windshield of this alternate embodiment has the same configuration as that of the aforementioned embodiment with the exception that, instead of having the touch sensitive layer 47 and the acoustic sensor layer 48 coupled to the switchable layer 45, the second stack of components comprises a glazing layer, plastic bonding layers and an active matrix display which works in conjunction with a sensor to track the position of the sun for generating a dark section on the display to effectively block the rays of the sun.

In all the embodiments, the glazing layer of each second stack of components is made of glass or other appropriate material such as polycarbonate, PMMA (polymethylmethacrylate) or hard polyurethane.

In several embodiments, each functional layer of the laminated glazing is selected from the group consisting of touch sensitive layers, acoustic sensors, light sensors or any other well-known sensors that may work alone or in combination with other functional layer to provide a desired functionality. Likewise, in some embodiments, each functional layer is selected from the group consisting of a heat reflecting film, a heat absorbing film, a variable light transmission film, illuminating means (such as light-emitting diodes) and a substrate for functional and aesthetic graphics.

In several embodiments, the plastic bonding interlayers are selected from the group consisting of polyvinyl butyl, ionoplast polymers, ethylene vinyl acetate, cast in place liquid resin and thermoplastic polyurethane.

In some embodiments, first and second stacks have a first and second set of lamination parameters, respectively. In a first step, it is applied a sufficient pressure to said first stack at a sufficient temperature and for a sufficient time to laminate said first stack according to the first set of lamination parameters. Next, in a second step, the second stack is disposed on a section of the first stack, forming a third stack which is laminated according to the second set of lamination parameters.

In addition, the third stack could be placed in a vacuum bag or vacuum press for applying vacuum. Silicon could be applied on edge faces of the second stack before being laminated to avoid trimming the laminated glazing on the section adjacent to the second stack.

It must be understood that this invention is not limited to the embodiments described and illustrated above. A person skilled in the art will understand that numerous variations and/or modifications can be carried out that do not depart from the features described in the present disclosure, which is only defined by the following claims.

The invention claimed is:

1. A laminated glazing with at least one step-shaped functional portion, comprising:
    a first stack of components comprising:
        an exterior glass layer having inner and outer surfaces;
        an interior glass layer having inner and outer surfaces; and
        at least one plastic bonding layer located between inner surfaces of said exterior and interior glass layers; and
    at least one second stack of components, wherein each stack of said at least one second stack of components comprises:
        a glazing layer;
        at least one functional layer; and
        at least one plastic bonding layer;
    wherein each stack of said at least one second stack of components is disposed on and bonded to a section of the outer surface of the interior glass layer of the first stack of components by one plastic bonding layer of said at least one plastic bonding layer of said second stack of components, forming a step-shaped portion;
    wherein said at least one second stack of components is placed over a portion of the first stack of components.

2. The laminated glazing of claim 1, wherein a functional layer of said at least one functional layer is a switchable film selected from the group consisting of SPD, PDLC, LC, electrochromic and thermochromic.

3. The laminated glazing of claim 1, wherein each functional layer of said at least one functional layer is selected from the group consisting of switchable layers, displays, illuminating means, touch sensitive layers, sensor layers, light sensors, acoustic sensors, acoustic PVB layers, heat reflecting films and heat absorbing films.

4. The laminated glazing of claim 1, wherein the first stack of components further comprises at least one functional layer.

5. The laminated glazing of claim 4, wherein a functional layer of said at least one functional layer of the first stack is selected from the group consisting of heat reflecting film and heat absorbing film.

6. The laminated glazing of claim 1, wherein in each stack of said at least one second stack of components, the glazing layer is selected from the group consisting of glass, polycarbonate, PMMA and hard polyurethane.

7. The laminated glazing of claim 6, wherein the selected glazing layer is an aluminosilicate glass having a thickness from 0.5 mm to 1.1 mm.

8. The laminated glazing of claim 1, wherein each plastic bonding layer of both first and of second stacks is selected from the group consisting of polyvinyl butyral, ionoplast polymers, ethylene vinyl acetate, cast in place liquid resin and thermoplastic polyurethane.

9. The laminated glazing of claim 1, further comprising a peripheral sealant layer covering edge faces of the second stack of components.

10. The laminated glazing of claim 1, wherein said laminated glazing is a vehicle glazing.

11. The laminated glazing of claim 10, wherein the vehicle glazing is a curved glazing.

12. The laminated glazing of claim 1, wherein the second stack of components further comprises a thin black band.

13. The laminated glazing of claim 11, wherein the vehicle glazing is a panoramic windshield, said at least one second stack of components is one second stack of components, said at least one functional layer of the second stack of components is one functional layer, and said functional layer is a switchable film; wherein the formed step-shaped portion is located above the driver vision zone.

14. The laminated glazing of claim 11, wherein the vehicle glazing is a panoramic windshield, said at least one second stack of components is two second stack of components, said at least one functional layer of each second stack of components is one functional layer, and said functional layer is a switchable film; wherein the two formed step-shaped portions are located symmetrically with respect to each other above the driver vision zone.

15. The laminated glazing of claim 1, wherein said at least one second stack of components is one stack of components, said at least one functional layer of the second stack is one functional layer, and said functional layer is an active matrix display which works in conjunction with a sensor to track the position of the sun for generating a dark section on the display, wherein the step-shaped portion is located above the driver vision zone.

16. A laminated glazing with at least one step-shaped functional portion, comprising:
    a first stack of components comprising:
        an exterior glass layer having inner and outer surfaces;
        an interior glass layer having inner and outer surfaces; and at least one plastic bonding layer located between inner surfaces of said exterior and interior glass layers; and at least one second stack of components, wherein each stack of said at least one second stack of components comprises:

a glazing layer;

at least one functional layer; and at least one plastic bonding layer;

wherein each stack of said at least one second stack of components is disposed on and bonded to a section of the outer surface of the interior glass layer of the first stack of components by one plastic bonding layer of said at least one plastic bonding layer of said second stack of components, forming a step-shaped portion;

wherein the surface of said at least one second stack of components is less than half of the surface of said first stack of components.

17. A laminated glazing with at least one step-shaped functional portion, comprising:

a first stack of components comprising:

an exterior glass layer having inner and outer surfaces;

an interior glass layer having inner and outer surfaces; and at least one plastic bonding layer located between inner surfaces of said exterior and interior glass layers; and at least one second stack of components, wherein each stack of said at least one second stack of components comprises:

a glazing layer;

at least one functional layer selected from the group consisting of switchable layers, displays, illuminating means, touch sensitive layers, sensor layers, light sensors, acoustic sensors, acoustic PVB layers, heat reflecting films and heat absorbing films or the combinations thereof; and at least one plastic bonding layer;

wherein each stack of said at least one second stack of components is disposed on and bonded to a section of the outer surface of the interior glass layer of the first stack of components by one plastic bonding layer of said at least one plastic bonding layer of said second stack of components, forming a step-shaped portion.

* * * * *